United States Patent
Saito

[11] Patent Number: 5,995,643
[45] Date of Patent: Nov. 30, 1999

[54] IMAGE INPUT SYSTEM BASED ON FINGER COLLATION

[75] Inventor: Akira Saito, Tokyo, Japan

[73] Assignee: Kabushiki Kaisha Toshiba, Kawasaki, Japan

[21] Appl. No.: 09/014,562

[22] Filed: Jan. 28, 1998

[30] Foreign Application Priority Data

Jan. 29, 1997 [JP] Japan ................................. 9-015200

[51] Int. Cl.$^6$ .................................................. G06K 9/00
[52] U.S. Cl. ........................................ 382/124; 382/116
[58] Field of Search ................................. 382/115, 116, 382/117, 124, 125; 395/200.55; 345/173

[56] References Cited

U.S. PATENT DOCUMENTS 5,408,536  4/1995  Lemelson ............................ 382/115
5,887,140  3/1999  Itsumi et al. ...................... 395/200.55

FOREIGN PATENT DOCUMENTS 7-29001   1/1995   Japan .

*Primary Examiner*—Joseph Mancuso
*Assistant Examiner*—Vikkram Bali
*Attorney, Agent, or Firm*—Foley & Lardner

[57] ABSTRACT

A read section reads an image. A feature extraction section extracts feature information of a finger, of a person to be authenticated, which is to be collated. The feature information of the finger of the person, which is to be collated, extracted by the feature extraction section is stored in a storage section in advance. A collation section collates feature information of the finger of the person, which is to be collated, extracted by the feature extraction section again, with the feature information read out from the storage section. A control section controls the input operation of the read section on the basis of the collation result obtained by the collation section.

15 Claims, 12 Drawing Sheets

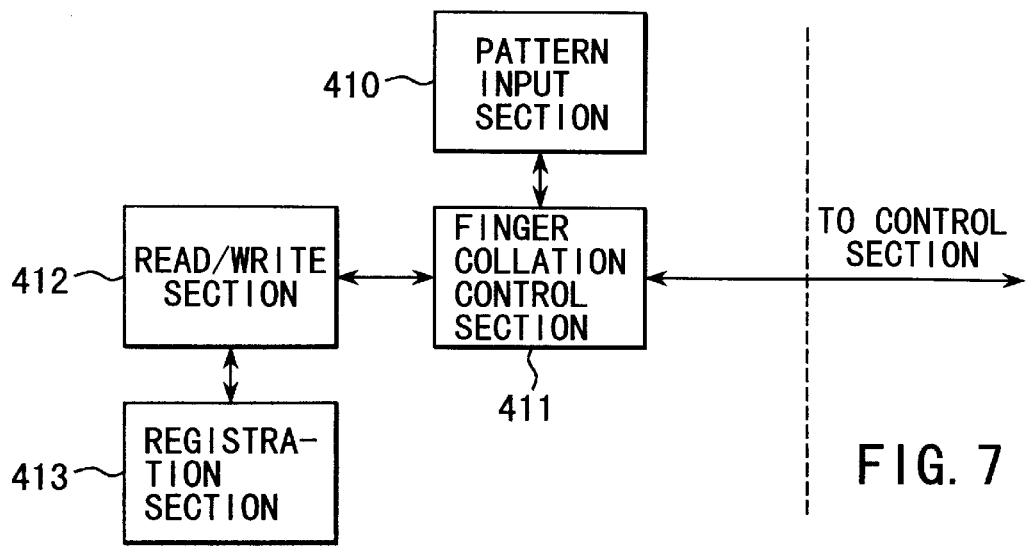
FIG. 7
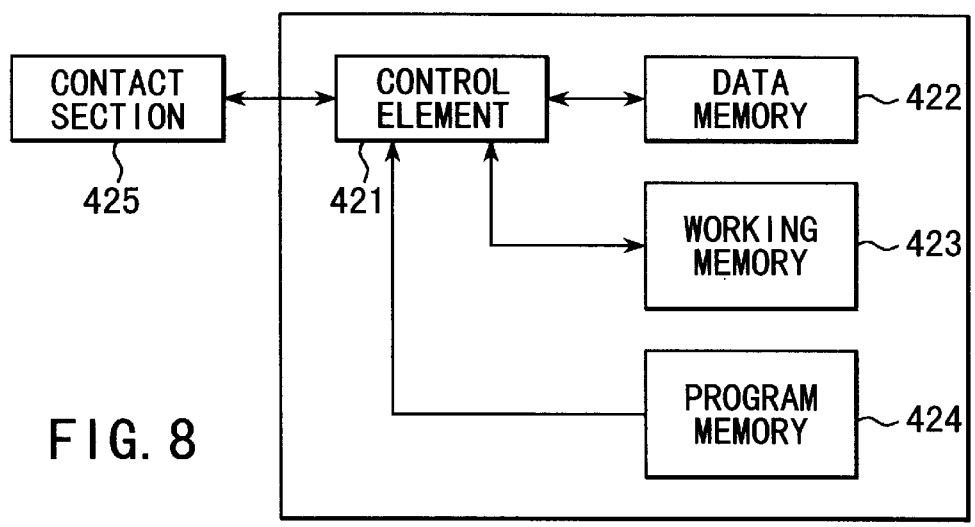
FIG. 8
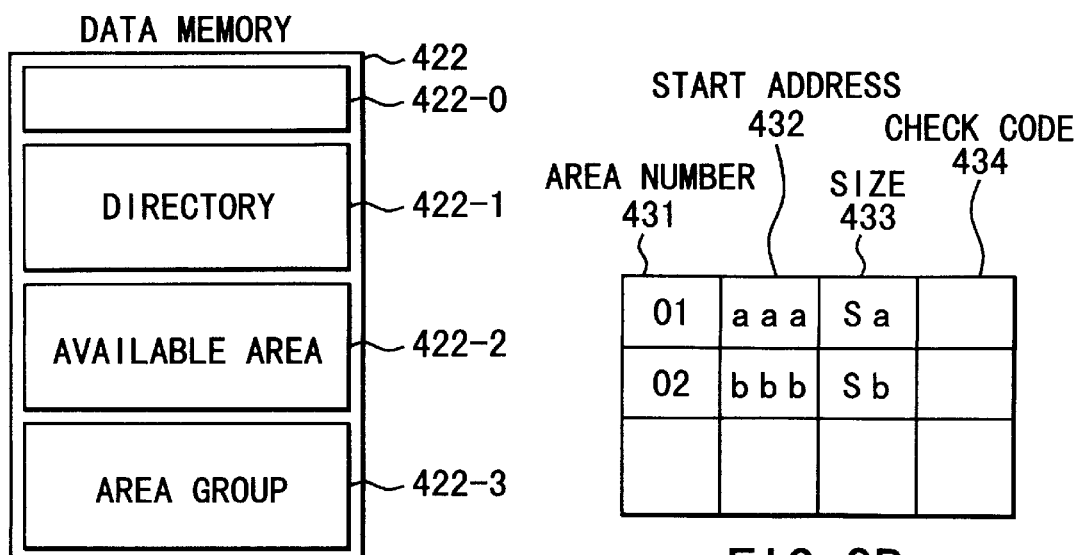
FIG. 9A
FIG. 9B

| USER ID | DIVISION/ SECTION | NAME | DESTINATION DIRECTORY |
|---|---|---|---|
| 920001 | FIRST SECTION OF DEVELOPMENT DIVISION | SUZUKI TARO | \\pc_suzuki\doc\text |
| 930002 | FIRST SECTION OF DEVELOPMENT DIVISION | SATO JIRO | \\sv_kaihatsu\tmp |
| 930003 | SECOND SECTION OF DEVELOPMENT DIVISION | TANAKA SABURO | \\pc_tanaka\share |
| ... | ... | ... | ... |

FIG. 15A

[920001 FIRST SECTION OF DEVELOPMENT DIVISION SUZUKI TARO] IS AUTHENTICATED. DESTINATION DIRECTORY IS [\\pc_suzuki\doc\text].

FIG. 15B

AUTHENTICATION ERROR HAS OCCURRED.
USE CORRECT FINGER

FIG. 15C

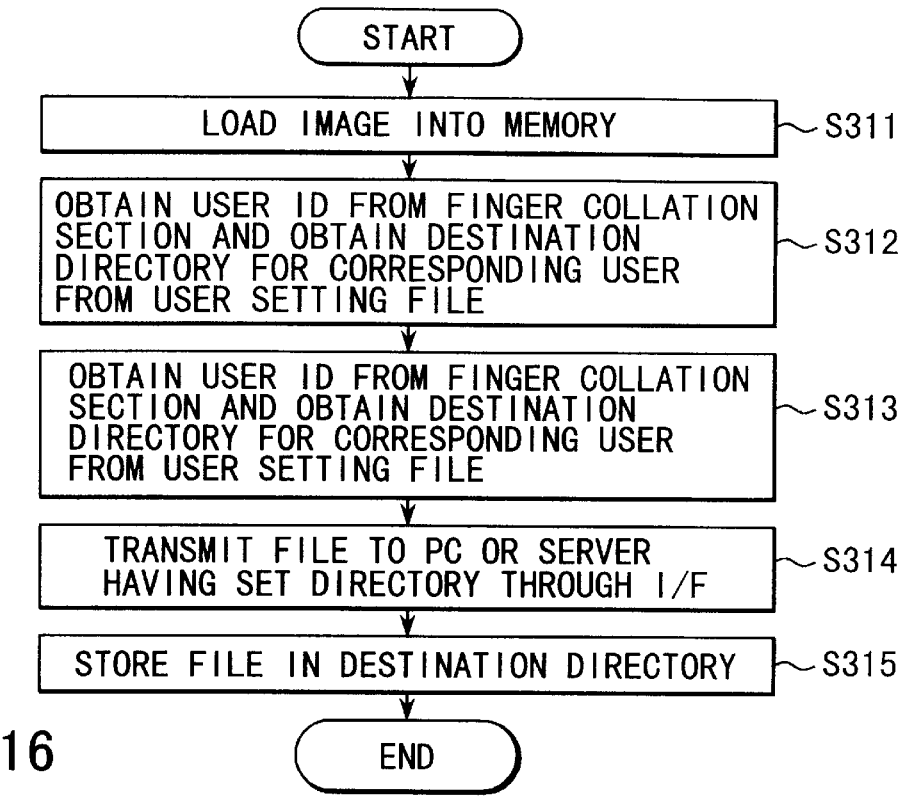

FIG. 16

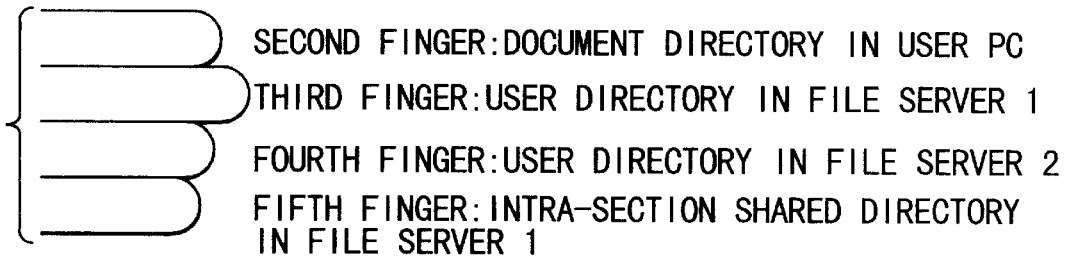

SECOND FINGER: DOCUMENT DIRECTORY IN USER PC
THIRD FINGER: USER DIRECTORY IN FILE SERVER 1
FOURTH FINGER: USER DIRECTORY IN FILE SERVER 2
FIFTH FINGER: INTRA-SECTION SHARED DIRECTORY IN FILE SERVER 1

FIG. 17

| USER ID | DIVISION/ SECTION | NAME | DESTINATION DIRECTORY |
|---|---|---|---|
| 920001 | FIRST SECTION OF DEVELOPMENT DIVISION | SUZUKI TARO | 2:\\pc_suzuki\doc\text<br>3:\\sv_kaihatsu\ka1\suzuki<br>4:\\sv_kaihatsu_alt\ka1\suzuki<br>5:\\sv_kaihatsu\ka1\common |
| 930002 | FIRST SECTION OF DEVELOPMENT DIVISION | SATO JIRO | 2:\\sv_kaihatsu\tmp |
| : | : | : | |

FIG. 18

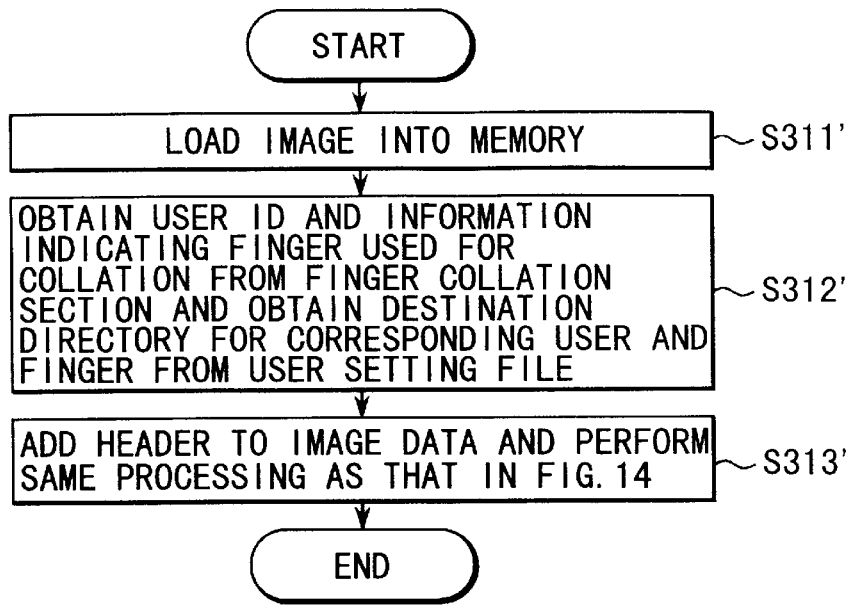
FIG. 19
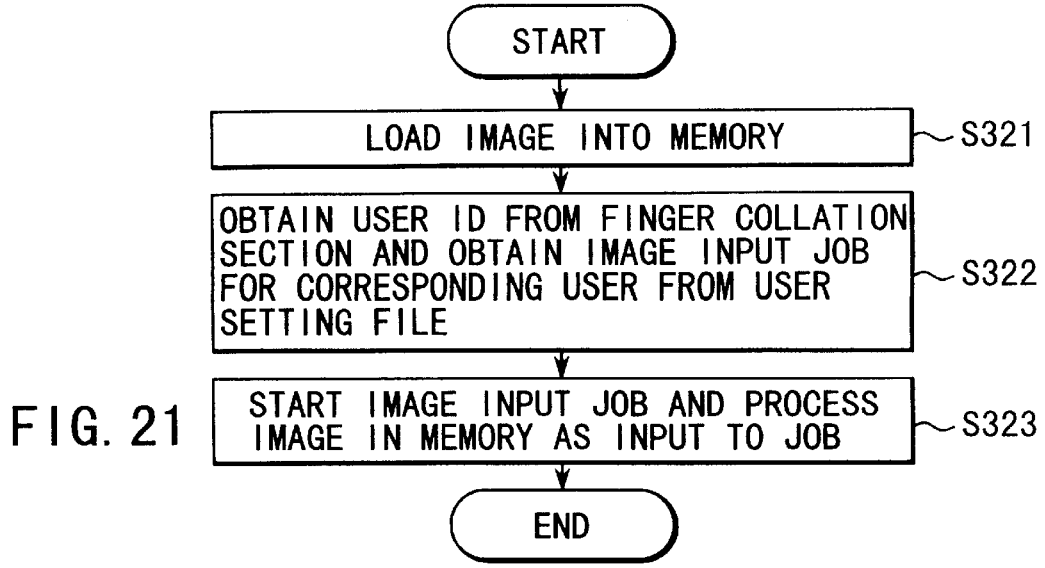
FIG. 20
FIG. 21

[920001 FIRST SECTION OF DEVELOPMENT DIVISION SUZUKI TARO] IS AUTHENTICATED. JOB[scn|ocr>\\pc_suzuki\doc\document1.txt] WILL BE EXECUTED.

FIG. 22

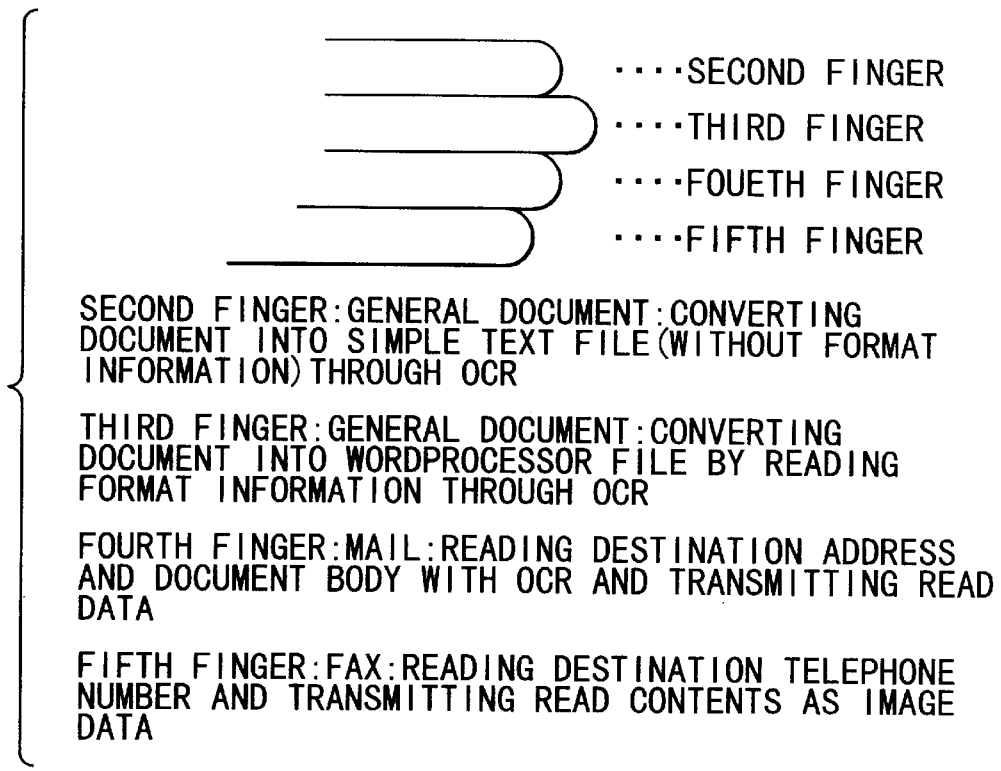

····SECOND FINGER
····THIRD FINGER
····FOUETH FINGER
····FIFTH FINGER

SECOND FINGER:GENERAL DOCUMENT:CONVERTING DOCUMENT INTO SIMPLE TEXT FILE(WITHOUT FORMAT INFORMATION)THROUGH OCR

THIRD FINGER:GENERAL DOCUMENT:CONVERTING DOCUMENT INTO WORDPROCESSOR FILE BY READING FORMAT INFORMATION THROUGH OCR

FOURTH FINGER:MAIL:READING DESTINATION ADDRESS AND DOCUMENT BODY WITH OCR AND TRANSMITTING READ DATA

FIFTH FINGER:FAX:READING DESTINATION TELEPHONE NUMBER AND TRANSMITTING READ CONTENTS AS IMAGE DATA

FIG. 23

| USER ID | DIVISION/ SECTION | NAME | JOB |
|---|---|---|---|
| 920001 | FIRST SECTION OF DEVELOPMENT DIVISION | SUZUKI TARO | 2:scn\|ocr>\\pc_suzuki\doc\document1.txt<br>3:scn\|ocr_from>\\pc_suzuki\doc\document1.doc<br>4:scn\|mail_reader<br>5:scn\|fax_reader |
| 930002 | FIRST SECTION OF DEVELOPMENT DIVISION | SATO JIRO | 2:scn\|ocr>\\sv_kaihatsu\tmp\scn.txt |
| : | : | : | |

FIG. 24

IMAGE INPUT SYSTEM BASED ON FINGER COLLATION

BACKGROUND OF THE INVENTION

The present invention relates to an image input system based on collation of users' fingers and, more particularly, to an image input apparatus for transmitting input images from a scanner shared by a plurality of users to file servers and user's personal computers on the basis of the results of collation of users' fingers, and an image input method.

An image input system using a network scanner has recently been put into practice. In the system, input images from the scanner shared by a plurality of users are transmitted to file servers and users' personal computers through a LAN (Local Area Network).

In this image input system using the network scanner, since the above scanner is shared by a plurality of users through the LAN, each user who has input image information to the scanner must be identified.

Conventionally, each user who has input image information is identified by the following methods, each having its own problem.

Method (1)

Pieces of image information (documents) input by users are temporarily transmitted/held to/in the shared directory (access is granted to all users) of the network scanner. Thereafter, the document input by each user is moved from the shared directory to the user's directory (access is granted to only the user) in accordance with, e.g., a terminal operation performed by the user.

Problem in Method (1)

In method (1), while image information (document) of a given user is held in the shared directory, other users can access the information. In handling an important document or the like, therefore, security of information cannot be ensured.

Method (2)

When image information is input, a user ID is input with the operation panel of the scanner, or a card reader is provided for the canner to read a user's ID card, thereby identifying the user. With this operation, the input image information is transmitted/ held to/in a preset user's directory.

Problem in Method (2)

In method (2), the user must perform an extra operation using the control panel or the card reader.

Method (3)

An instruction sheet on which a user ID and a destination directory are written is attached to an input image to be input together. The information on the instruction sheet is then interpreted to identify the user.

Problem in Method (3)

In method (3), an instruction sheet is required for every input operation, and a function of interpreting the information on the instruction sheet, e.g., an OCR, is required. In addition, an operation error may be caused by an interpretation error.

As an image input system in which images are input by a scanner shared by a plurality of users, like the above network scanner, a system capable of executing proper processing in accordance with the settings determined by the respective users without requiring the users to perform extra operations and without allowing breaches of security is required.

BRIEF SUMMARY OF THE INVENTION

The present invention has been made in consideration of the above situation, and has as its object to provide an image input apparatus and method, in an image input system for transmitting input images from a scanner shared by a plurality of users to file servers, users' personal computers, and the like through a LAN (Local Area Network) or the like, which can execute proper processes corresponding to the settings made by the respective users, when images are input by using the scanner shared by a plurality of users, without requiring each user to perform an extra operation and without allowing breaches of security.

According to the first aspect of the present invention, there is provided an image input apparatus comprising:

read means for reading an image;

feature extraction means for extracting feature information of a finger, of a person to be authenticated, which is to be subjected to collation;

storage means for storing in advance the feature information, of the finger of the person which is to be collated, extracted by the feature extraction means;

collation means for collating feature information, of the finger of the person which is to be collated, extracted by the feature extraction means again, with the feature information read out from the storage means; and control means for controlling an image input operation of the read means based on a collation result obtained by the collation means.

According to the second aspect of the present invention, there is provided an image input method using read means for reading an image, comprising the steps:

extracting feature information of a finger, of a person to be authenticated, which is to be subjected to collation;

storing in advance the extracted feature information of the finger of the person which is to be collated:

collating re-extracted feature information of the finger of the person, which is to be collated, with the feature information stored in advance; and controlling an image input operation of the read means based on a result obtained by collating the feature information.

According to the third aspect of the present invention, there is provided an image input apparatus comprising:

read means for reading an image;

feature extraction means for extracting feature information of each finger, of a person to be authenticated, which is to be subjected to collation;

storage means for storing in advance the feature information, of each finger of the person which is to be collated, extracted by the feature extraction means;

collation means for collating feature information, of each finger of the person which is to be collated, extracted by the feature extraction means again, with the feature information read out from the storage means; and control means for controlling a job set for each finger by the person in advance with respect to the read means based on a collation result obtained by the collation means.

According to the fourth aspect of the present invention, there is provided an image input method using read means for reading an image, comprising the steps:

extracting feature information of each finger, of a person to be authenticated, which is to be subjected to collation;

storing in advance the extracted feature information of each finger of the person which is to be collated;

collating re-extracted feature information of each finger of the person, which is to be collated, with the feature information stored in advance; and controlling a job set for each finger by the person in advance with respect to the read means based on a result obtained by collating the feature information.

According to the fifth aspect of the present invention, there is provided an image input apparatus comprising:

read means for reading an image;

a linear electrode array on which a finger, of a person to be authenticated, which is to be collated is to be placed, the linear electrode array being constituted by a plurality of linear electrodes elongated in a direction perpendicular to a longitudinal direction of the finger and arranged at predetermined intervals along the longitudinal direction of the finger;

switching means for sequentially switching the plurality of linear electrodes of the linear electrode array;

feature extraction means for sequentially reading resistance values between adjacent linear electrodes of the linear electrode array in the longitudinal direction of the finger based on a switching operation for the linear electrodes of the linear electrode array which is performed by the switching means, thereby extracting feature information of the finger from a distribution state of the resistance values;

storage means for storing in advance the feature information, of the finger of the person which is to be collated, extracted by the feature extraction means;

collation means for collating feature information, of the finger of the person which is to be collated, extracted by the feature extraction means again, with the feature information read out from the storage means; and control means for controlling an image input operation of the read means based on a collation result obtained by the collation means.

According to the sixth aspect of the present invention, there is provided an image input method using read means for reading an image, comprising the steps of:

placing a finger, of a person to be authenticated, which is to be collated on a linear electrode array elongated in a direction perpendicular to a longitudinal direction of the finger and arranged at predetermined intervals along the longitudinal direction of the finger;

sequentially switching the plurality of linear electrodes of the linear electrode array;

sequentially reading resistance values between adjacent linear electrodes of the linear electrode array in the longitudinal direction of the finger based on a switching operation for the linear electrodes of the linear electrode array, thereby extracting feature information of the finger from a distribution state of the resistance values;

storing in advance the extracted feature information of the finger to be collated in storage means;

collating re-extracted feature information with the feature information in the storage means; and controlling an image input operation of the read means based on a result obtained by collating the feature information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 7 is a block diagram for explaining the schematic arrangement of the finger collation section in the scanner section in FIG. 1;

FIG. 8 is a block diagram for explaining the schematic arrangement of the registration section of the finger collation section in FIG. 7;

FIGS. 9A and 9B are views for explaining the data memory of the registration section of the finger collation section in FIG. 7;

FIGS. 15A, 15B, and 15C are views showing a user setting file and sample displays on the control panel in the first embodiment of the present invention;

FIG. 16 is a flow chart for explaining image input processing in the first embodiment of the present invention;

FIG. 17 is a view for explaining how destination directories are set for the respective fingers in the second embodiment of the present invention;

FIG. 18 is a view showing a user setting file in the second embodiment of the present invention;

FIG. 19 is a flow chart for explaining image input processing in the second embodiment of the present invention;

FIG. 20 is a view showing a user setting file in the third embodiment of the present invention;

FIG. 21 is a flow chart for explaining image input processing in the third embodiment of the present invention;

FIG. 22 is a view showing a sample display on a control panel in the third embodiment of the present invention;

FIG. 23 is a view for explaining how jobs are set for the respective fingers in the fourth embodiment of the present invention;

FIG. 24 is a view showing a user setting file in the fourth embodiment of the present invention;

DETAILED DESCRIPTION OF THE INVENTION

Figure 1:
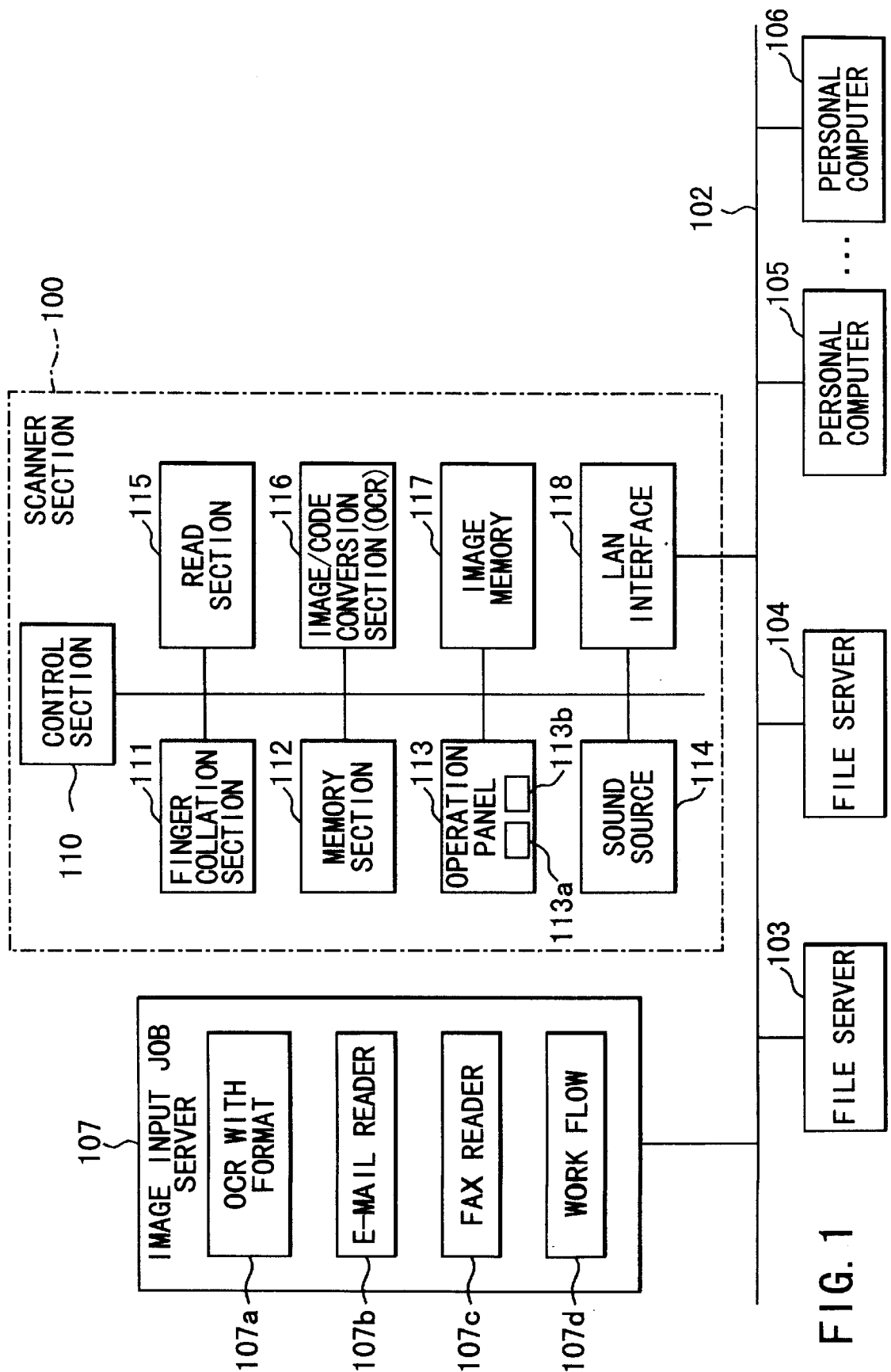
FIG. 1 is a block diagram for explaining the overall schematic arrangement of an image input system of the present invention.

Reference will now be made in detail to the presently preferred embodiments of the invention as illustrated in the accompanying drawings, in which like reference characters designate like or corresponding parts throughout the several drawings.

Embodiments of the present invention will be described below with reference to the accompanying drawings.

FIG. 1 is a block diagram for explaining the overall schematic arrangement of an image input system to which the first embodiment of the present invention is applied.

This image input system is constituted by a scanner section 100 and file servers 103 and 104, a plurality of personal computers 105, 106, . . . , and an image input job server 107 which are connected to the scanner section 100 through a LAN (communication line) 102.

In this case, the file servers 103 and 104 serve to store users' individual data and data shared by the users.

The personal computers 105, 106, . . . are used by the respective users individually.

The image input job server 107 includes an OCR 107a with a format as an image input job, an E-mail reader 107b, a FAX reader 107c, and a work flow 107d.

Note that this image input job server 107 may be incorporated in the scanner section 100.

The scanner section 100 has a finger collation section 111.

The finger touch section (pattern input section) of the finger collation section 111 is integrated with a scan start button 113b on an operational panel 113 as will be described later.

A user sets an original on a read section 115 of the scanner section 100 to input an image from the original. The start button 113b is depressed to perform user authentication processing.

The contents read from the original are then transmitted to the file servers 103 and 104 and the personal computers 105, 106, . . . on the basis of this authentication result.

For the above operation, the scanner section 100 includes a control section 110 for controlling the overall scanner section 100.

The sections connected to the control section 110 include the finger collation section 111 for performing user authentication processing by the above finger collation, a memory section 112 storing control programs and having various tables, the operation panel 113 constituted by a touch panel and the like, which has a display section (to be also referred to as a control panel) 113a for guiding various types of operations, the start button 113b, and the like, a sound source 114 constituted by a loudspeaker and the like and designed to generate electronic sounds, the read section 115 for reading the image data of an original image, an image code conversion section (OCR) 116 for converting image information into text information, an image memory 117 for storing the image data read by the read section 115, and a LAN interface 118 for outputting data to the file servers 103 and 104 and the personal computers 105, 106, . . . through the LAN 102.

The scanner section 100 and the operation panel (control panel) 113 will be described in detail next with reference to FIGS. 2 and 3.

Figure 2:
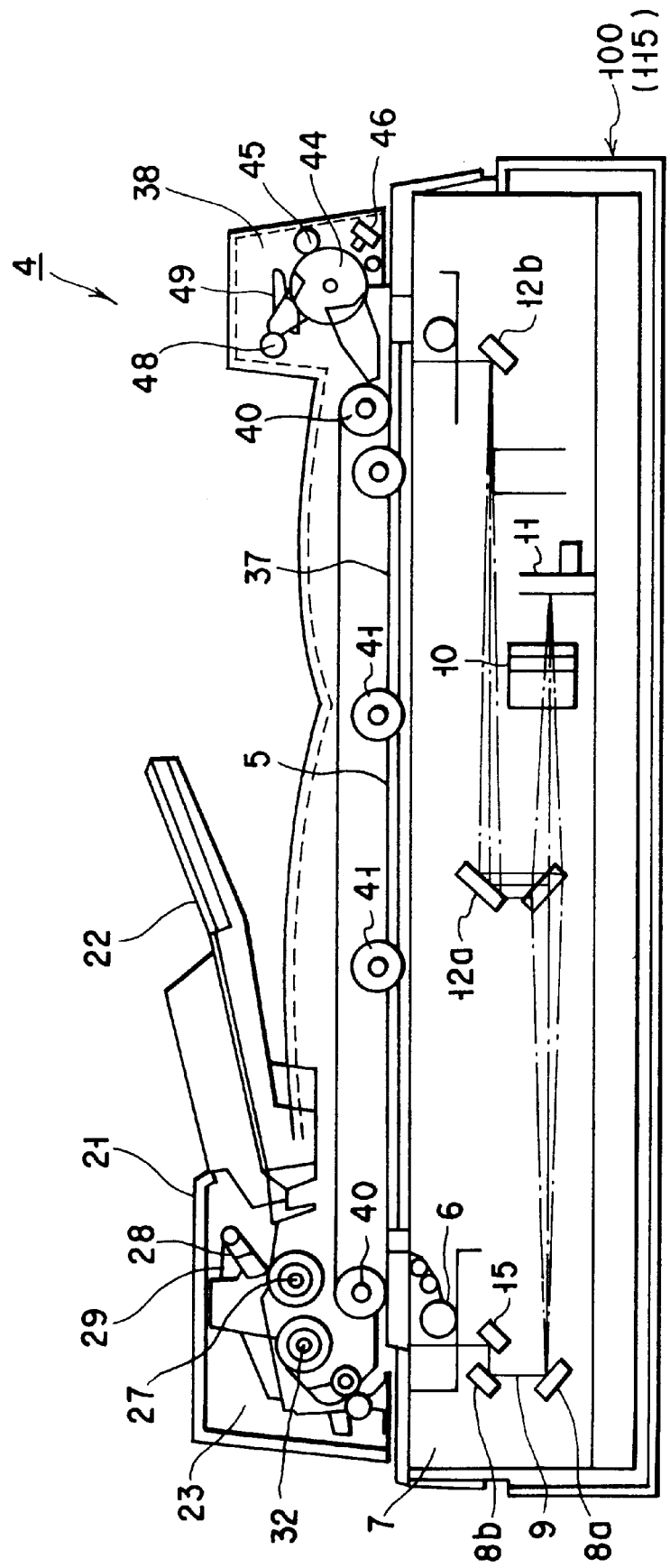
FIG. 2 is a sectional view for explaining the schematic arrangement of a scanner section in FIG. 1.

FIG. 2 is a sectional view schematically showing the overall arrangement of the scanner section 100 applied to the image input system of the present invention.

An automatic document feeder (ADF) 4 is mounted on the scanner section 100.

The edge portion on the rear end of a cover body 21 as the housing of the automatic document feeder 4 is pivotally mounted on the edge portion on the rear end of the upper surface of the apparatus body through a hinge unit (not shown). The overall automatic document feeder 4 can be pivoted to open an original table 5, as needed.

An original feed table 22 capable of holding a plurality of originals together is mounted on the upper surface of the cover body 21 at a slightly right position.

A feed means 23 for sequentially feeding originals one by one to one end side (the left end side in FIG. 2) of the original table 5 is mounted on one end side of the automatic document feeder 4.

This feed means 23 includes a pickup roller 27 for picking up an original, a weight plate 28 for pressing an original against the pickup roller 27, an empty sensor 29 serving as an original sensor for detecting the set state of an original on the original feed table 22, and the like.

In addition, a feed roller 32 is placed in the direction in which an original is picked up by the pickup roller 27, thereby reliably feeding originals one by one.

An original convey belt 37 is stretched over the upper surface of the original table 5 to cover it.

The original convey belt 37 is a wide endless belt having a white surface and looped around a pair of belt rollers 40. This belt can be moved in the forward and reverse directions by a belt driving mechanism (not shown).

A plurality of belt press rollers 41 for pressing the belt surface against the original table 5 and a set switch (not shown) for detecting the open/close state of the automatic document feeder 4 are arranged on the rear, inner surface side of the original convey belt 37.

The original fed by the feed means 23 is conveyed from one end side (left end side) to the other end side (right end side) of the original table 5.

A paper discharge means 38 mounted on the right side portion of the automatic document feeder 4 includes a convey roller 44, a pinch roller 45 for pressing an original against the convey roller 44, a paper discharge sensor 46 serving as an original detection means for detecting the trailing end of the original conveyed in the paper discharge direction, and the like.

A paper discharge roller 48 is placed on the downstream side of the original discharge path.

A gate 49 for reversing an original and guiding it to the original table 5 is placed on the original discharge path to allow double-sided scanning for the original.

The scanner section 100 is constituted as the read section 115 in FIG. 1 by an exposure lamp 6 serving as a light source, a first carriage 7 having a mirror 15, a second carriage 9 having mirrors 8a and 8b for bending the optical path, a lens 10, a CCD sensor 11 for receiving reflected light, a driving system (not shown) for changing the positions of the above components, and an A/D conversion section (not shown) for converting an output, i.e., image data (information), from the CCD sensor 11 from analog data to digital data.

The first and second carriages 7 and 9 are coupled to each other through a timing belt (not shown). The second carriage 9 moves in the same direction as the moving direction of the first carriage 7 at a speed ½ that of the first carriage 7.

With this structure, scanning can be performed such that the length of the optical path to the lens 10 is made constant. The lens 10 has a fixed focal length and is moved in the optical axis direction in the magnifying mode.

One element of the CCD sensor 11 corresponds to one pixel of an original.

An output from the CCD sensor 11 is sent to the A/D conversion section (not shown).

The first and second carriages 7 and 9 and mirrors 12a and 12b are respectively moved by stepping motors (not shown).

The first and second carriages 7 and 9 are moved in accordance with the action of the timing belt (not shown) looped between a drive pulley (not shown) coupled to the rotating shaft of the above stepping motor and an idle pulley (not shown).

The lens 10 is moved in the optical axis direction in accordance with the action of a spiral shaft (not shown) rotated by the corresponding stepping motor (not shown).

Figure 3:
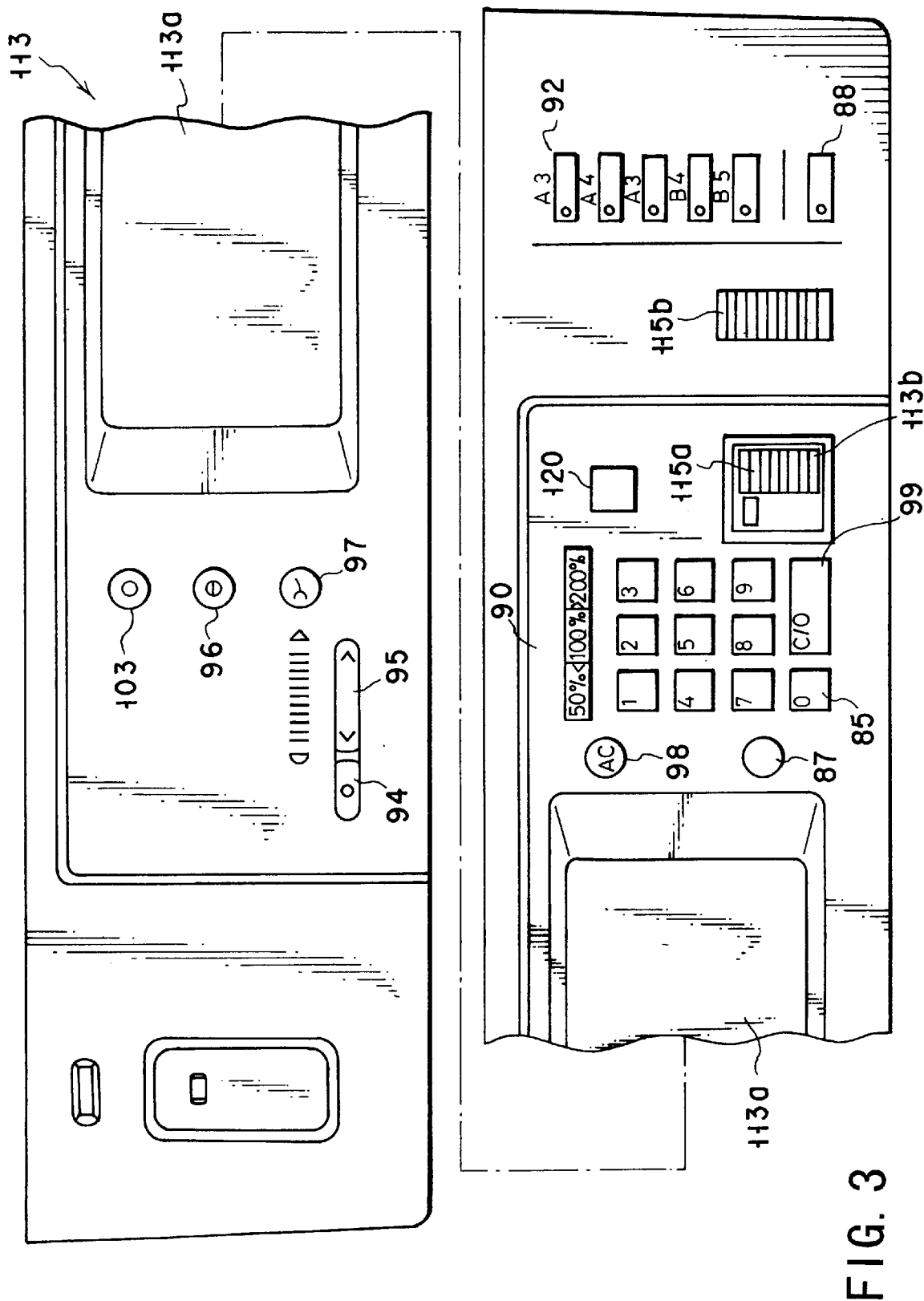
FIG. 3 is a front view for explaining the schematic arrangement of the operation panel of the scanner section in FIG. 2.

FIG. 3 shows the detailed arrangement of the operation panel (control panel) 113 serving as an operation means.

The operation panel 113 is constituted by a HELP key 87, an automatic magnification selection key 89, a zoom/100% key unit 90, an original size key unit 92, the display panel (to be also referred to as a message display unit or a control panel) 113a, an automatic resolution key 94, a manual resolution key 95, an interrupt key 97, an all clear key 98, a clear/stop key 99, the scan (start) key 113b, a ten-key pad 85, and a function switching key 120.

Various types of pictographs are displayed to flicker on the display panel 113a to indicate the state of the scanner section 100.

When the HELP key 87 is depressed as an operation guide key, a message indicating an operation procedure is displayed on the display panel 113a. When this key is depressed after setting a desired function, the set contents can be checked.

An automatic original size detection key 88 is normally set in the automatic original size detection mode to automatically detect the size of the original set on the original table (glass) 5 (in only the one-to-one scan mode).

When the "25%<" key of the zoom/100% key unit 90 is depressed, the scan magnification decreases to 25% in unitary decrements.

When the ">800%" key is depressed, the scan magnification increases to 800% in unitary increments.

When the "100%" key is depressed, the one-to-one scan (100%) is restored.

The original size key unit 92 is used to set the original size.

The display panel (message display unit) 113a displays the state of the scanner section 100, operation procedure, and various instructions to a user with characters and pictures.

The display panel (message display unit) 113a serving as a display means incorporates a touch panel and allows function setting.

When the automatic resolution key 94 is depressed to set the automatic resolution mode, the scanner section 100 automatically detects the density of an original and selects the optimal resolution for a scan.

When the manual resolution key 95 is depressed to select the manual resolution mode, a desired resolution in a scan can be selected.

The resolution in a scan can be decreased in five steps by depressing the "low" key of the manual resolution key 95. The solution in a scan can be increased in five steps by depressing the "high" key of the manual resolution key 95.

When a preheat key 96 is depressed, the scanner section 100 is set in a preheat (power saving) state, and all the display lamps are turned off.

To set the scanner section 100 in the scan mode again, the preheat key 96 is depressed again.

The interrupt key 97 is used to perform an interrupting scan in the process of a continuous scan.

When the all clear key 98 is depressed, all the selected modes are cleared, and the standard state is restored.

The clear/stop key 99 is used to correct the scan count or to stop a scan in progress.

The start button 113b is depressed to start a scan. The start button 113b is also depressed to register the finger authentication information of each user in advance so as to perform finger collation of a plurality of users sharing this scanner section 100.

A finger collation section 115a (to be described later) is placed on the start button 113b.

In addition to the finger collation section 115a on the start button 113b, a finger collation section 115b may be placed at another position on the operation panel 113.

When a timer key 103 is depressed, the specific time at which the power supply of the scanner section 100 is turned on/off every time is displayed on the display panel (message display unit) 113a (when a weekly timer is set).

The ten-key pad 85 is used to set the scan count between 1 to 999.

The function switching key 120 is used to switch between the normal scan function of the scanner section 100 and other functions such as the function of registering the finger authentication information about each user.

The finger collation section 115a will be described next.

Figure 4:
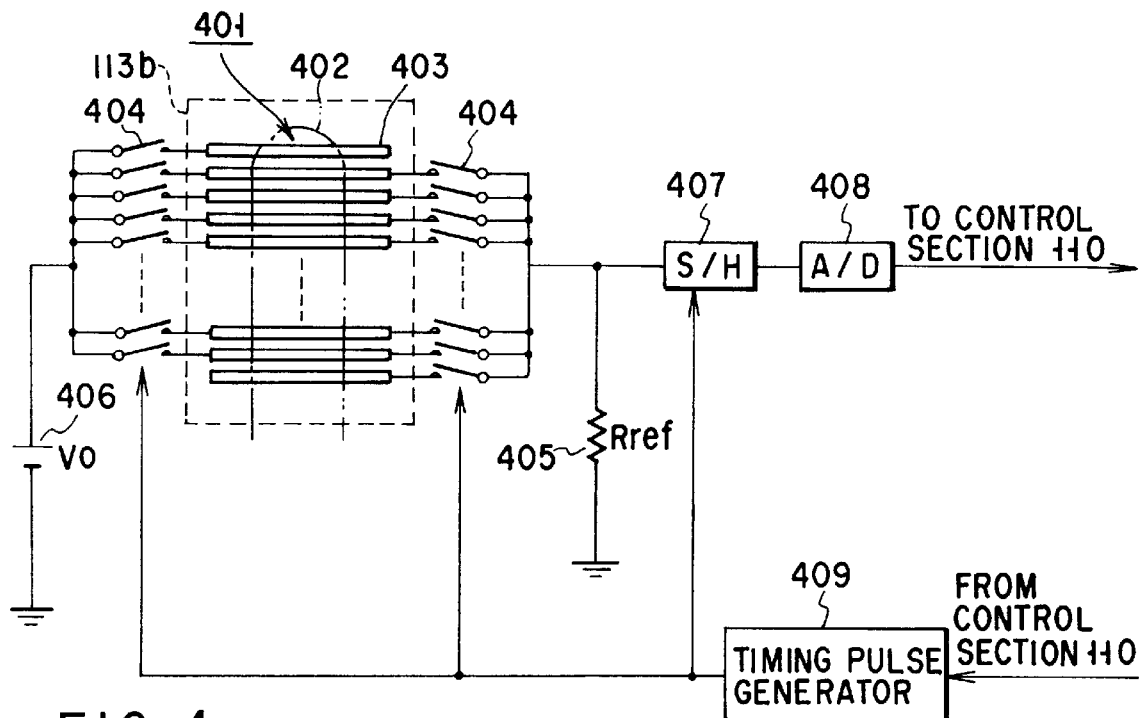
FIG. 4 is a block diagram for explaining the schematic arrangement of a finger collation section in the scanner section in FIG. 1.

As shown in FIG. 4, the finger collation section 115a used in the present invention has a plurality of linear electrodes 401 elongated in a direction perpendicular to the longitudinal direction of a finger 402 of a user. These linear electrodes 401 are arranged on a surface portion of the above scan (start) button 113b in the longitudinal direction of the finger 402. When the finger 402 is pressed on the linear electrodes 401, the resistance values between the respective adjacent linear electrodes 401 are sequentially read in the longitudinal direction of the finger 402 to be synthesized with each other. The finger collation section 115a uses the resultant signal.

Referring to FIG. 4, reference numeral 401 denotes a linear electrode array. The spaces between the electrodes are set to about ¹⁄₁₀ (mm).

The number of electrodes 401, i.e., the longitudinal length of the electrode array 401, is generally set to a length longer than the portion between the tip of the finger 402 and the second joint portion.

The finger 402 to be subjected to signal detection is pressed on the electrodes 401 in a direction perpendicular to the electrode array direction.

At this time, the resistance values on the surface of the finger 402 between the respective adjacent electrodes 401 are sequentially read in the longitudinal direction of the finger 402 by switching analog switches 404.

When the finger 402 is pressed on n electrodes 401, different resistance values are generated between the adjacent electrodes 401 as contact elements in accordance with the contact areas between the finger 402 and the electrodes 401.

In this case, the resistance value between the (I−1)th and ith electrodes 401 is represented by R(i), and a reference resistor (Rref) 405 and a power supply 406 with a constant voltage Vo are connected to the two adjacent electrodes 401 through the analog switches 404, as shown in FIG. 4.

Then, a potential difference V(i) across the two ends of the reference resistor (Rref) 405 is given by $$V(i)=Rref \cdot Vo/(Rref+R(i)) \qquad (1)$$

Such potential differences are sequentially read in the longitudinal direction of the finger 402 by switching the analog switches 404. The read potential differences are converted into a digital signal by an analog/digital (A/D) converter 408 through a sample/hold (S/H) circuit 407.

A timing pulse generator 409 generates a signal for switching the analog switches 404 and controlling the sample timing of the sample/hold circuit 407 on the basis of a control signal from the control section 110 in FIG. 1.

Figure 5:
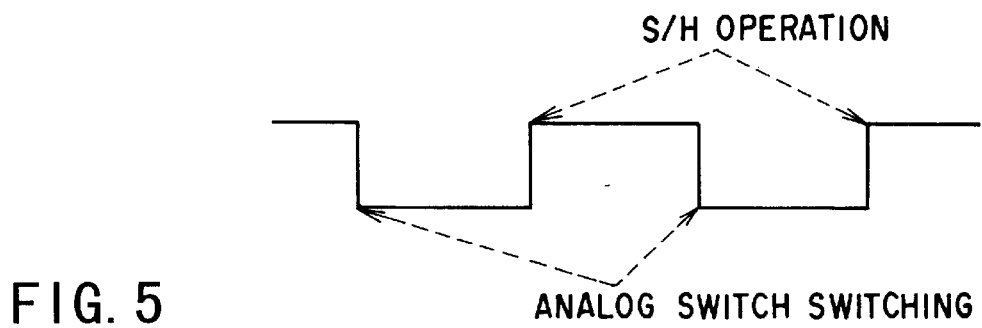
FIG. 5 is a timing chart showing a control signal used for the finger collation section in FIG. 4.

As shown in FIG. 5, for example, the analog switches 404 are switched at the trailing edges of this signal, and the potential differences V(i) given by equation (1) are held by the sample/hold circuit 407 at the leading edges of this signal.

Figure 6:
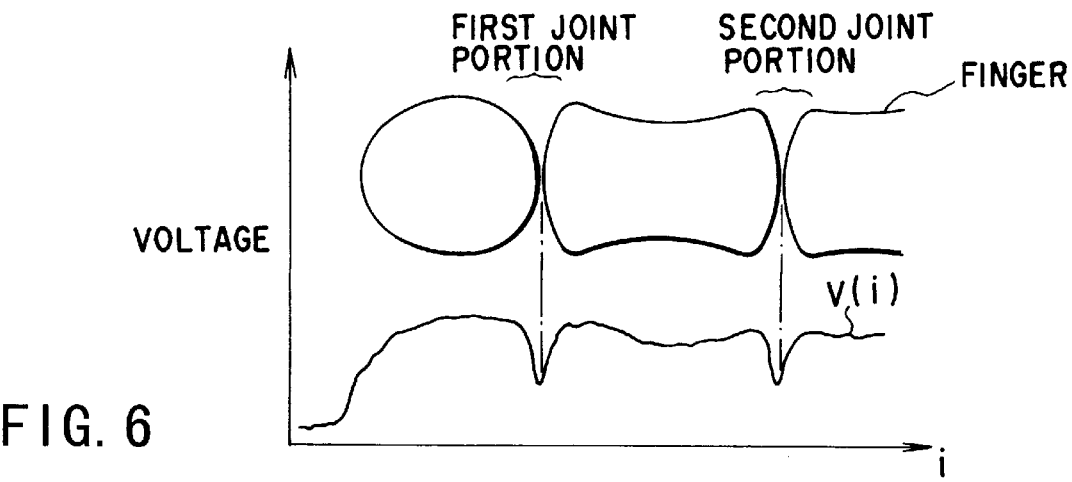
FIG. 6 is a graph for explaining a projection signal obtained by the finger collation section in FIG. 4.

As shown in FIG. 6, for example, a signal V(i) obtained in this manner exhibits large values (V(i)) at portions where the contact areas between the finger 402 and the electrodes 401 are large, but exhibits small values (V(i)) at the creases in the first and second joint portions because the contract areas are small. At these creases, therefore, the signal V(i) has steep dips.

This signal V(i) will be referred to as a projection signal hereinafter.

FIG. 7 shows the arrangement of the individual authentication device included in the finger collation section 115a.

This individual authentication device is constituted by a pattern input section 410 for inputting the one-dimensional pattern V(i) of the overall finger 402 in accordance with the differences between the contact areas between the finger 402 and the electrodes 401 on the basis of the above principle, a finger collation control section 411 for performing authentication processing such as collation and registration (to be described later), and a read/write section 412 for writing projection signals corresponding to the respective users to be authenticated in a registration section 413, and reading out the projection signals from the registration section 413.

The control section 110 in FIG. 1 controls the scanner section 100 on the basis of authentication results from the finger collation control section 411 in the above manner to permit only the registered users to use the scanner section 100.

As shown in FIG. 8, the above registration section 413 is constituted by a control element (e.g., a CPU) 421 serving as a control section, a nonvolatile data memory 422 that can be erased, a working memory 423, a program memory 424, and a contact section 425 for obtaining electrical contact with the read/write section 412 in FIG. 7.

Of these components, the components within the area enclosed with the dashed line (the control element 421, the data memory 422, the working memory 423, and the program memory 424) are integrated into one IC (or a plurality of ICs) and buried in the main body of the registration section 413.

The data memory 422 is used to store various types of data, and is constituted by an EEPROM or the like.

The program memory 424 is constituted by a mask ROM or the like and used to store programs for the control element 421.

As shown in FIG. 9A, for example, the data memory 422 is divided into a control area 422-0, a directory 422-1, an available area 422-2, and an area group 422-3.

The respective areas are managed by the directory 422-1.

As shown in FIG. 9B, this directory is an area definition information set constituted by area numbers 431 of the respective areas, start addresses 432 of the areas, sizes 433, and check codes 434.

For example, the start address 432 of area 01 corresponds to address "aaa", and the size 433 of area 01 corresponds to Sa bytes.

Figure 10:
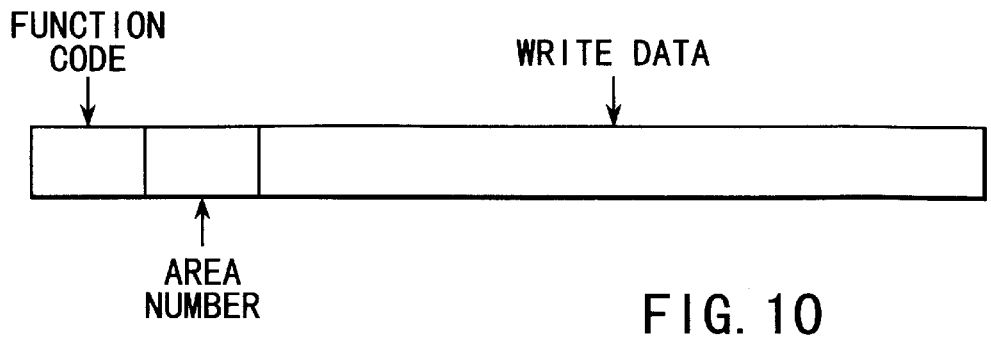
FIG. 10 is a view for explaining an access command stored in the data memory of the registration section of the finger collation section in FIG. 7.

As shown in FIG. 10, a write command as an access command for such an area is constituted by a function code indicating a write command, an area number indicating the area to be accessed, and write data.

The concept of the operation of the registration section 413 will be described next with reference to FIG. 11.

Figure 11:
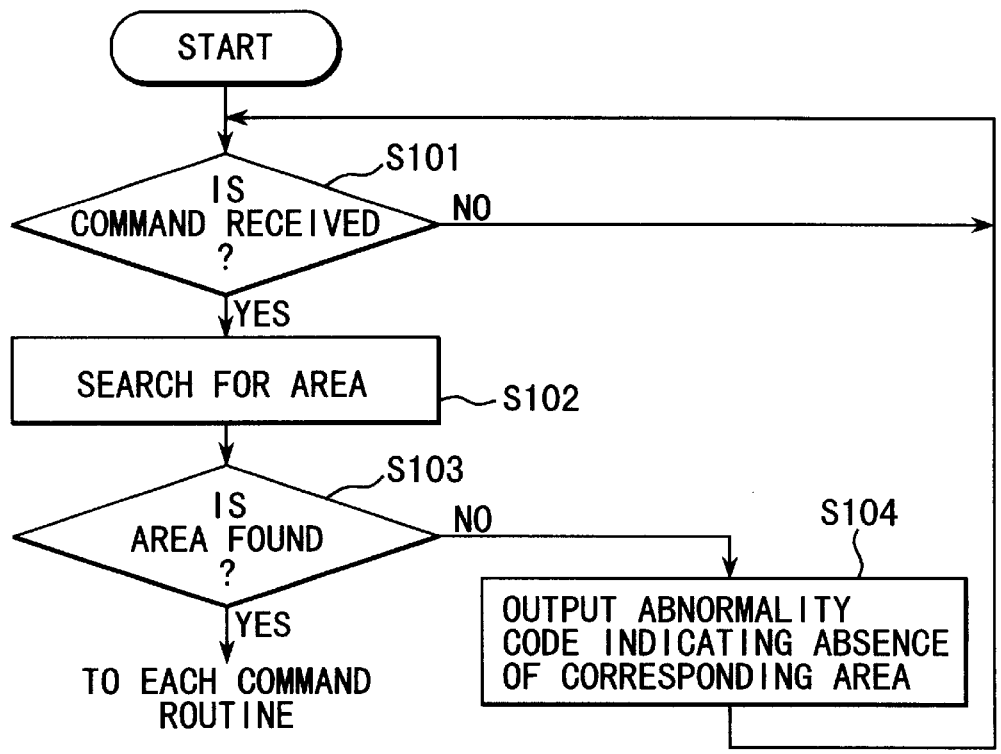
FIG. 11 is a flow chart for explaining the concept of the operation of the registration section of the finger collation section in FIG. 7.

As shown in FIG. 11, the registration section 413 is electrically activated to be set in the command wait state (step S101).

The registration section 413 keeps waiting for a command in this state. Upon reception of a command, the registration section 413 extracts the area number from the command and checks the presence/absence of the corresponding area number in the directory (steps S102 and S103).

If the corresponding area number is not present in the directory after this search, the registration section 413 outputs a code indicating the absence of the corresponding area (step S104), and returns to the command wait state.

If the corresponding area number is present in the directory, the registration section 413 performs processing in accordance with a command routine corresponding to the function code, in the command, which is received after the above operation. Upon outputting the processing result, the registration section 413 returns to the command wait state.

The flow of processing in the individual authentication device included in the finger collation section 115a will be described next.

The processing in this individual authentication device is roughly divided into two operations, i.e., "registration" and "collation".

Registration will be described first.

<Registration>

Figure 12:
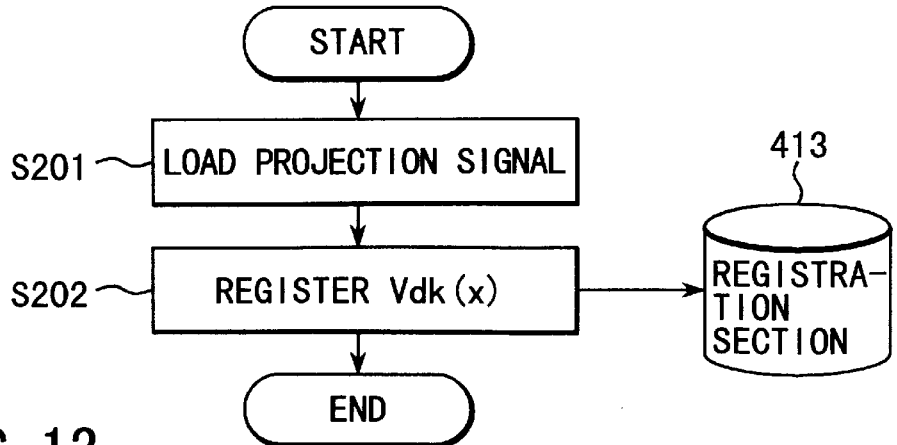
FIG. 12 is a flow chart for explaining registration processing in the finger collation section in FIG. 7.

FIG. 12 shows the flow of processing for registration.

As shown in FIG. 12, first of all, the finger collation control section 411 loads the projection signal V(i) through the pattern input section 410 (step S201).

The finger collation control section 411 then registers the loaded projection signal V(i) as a dictionary signal (feature amount extraction signal) Vd(i) in the registration section 413 through the read/write section 412 (step S202).

With the above operation, the registration processing is complete.

<Collation>

Figure 13:
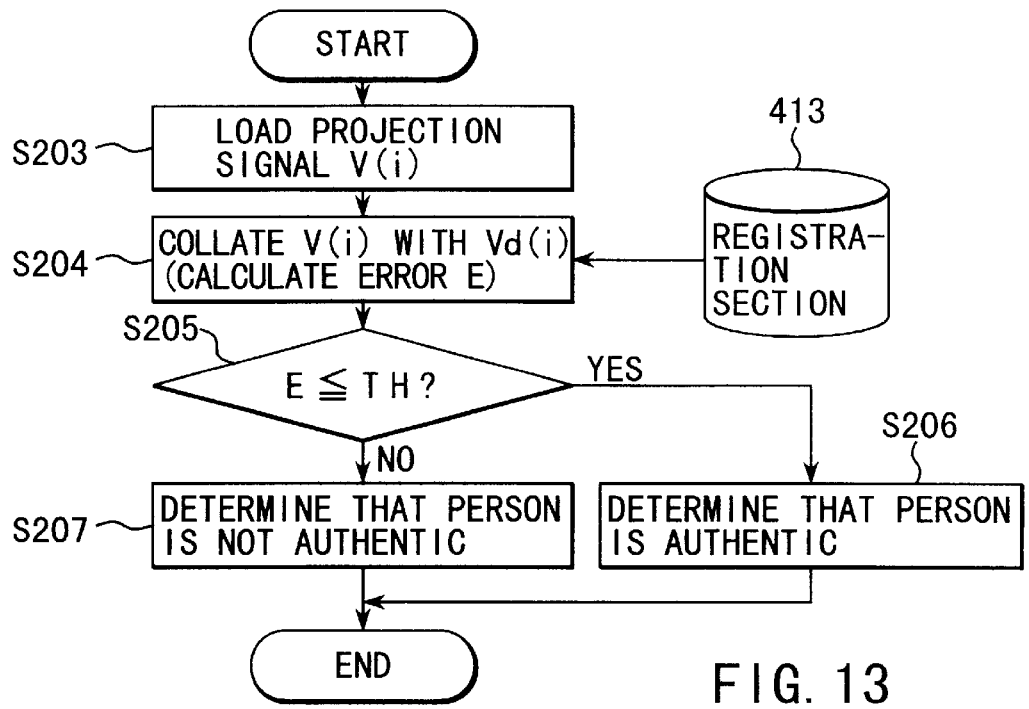
FIG. 13 is a flow chart for explaining collation processing in the finger collation section in FIG. 7.

FIG. 13 shows the flow of processing for collation.

As shown in FIG. 13, first of all, the finger collation control section 411 loads the projection signal V(i) again through the pattern input section 410 (step S203).

The finger collation control section 411 then performs a collation calculation based on the dictionary signal Vd(i) registered in step S202 and the projection signal V(i) loaded in the step S203 (step S204).

This collation is executed by calculating an error E in accordance with the following procedure.

First of all, the finger collation control section 411 positions the dictionary signal Vd(i) read out from the registration section 413 and the projection signal V(i) obtained from the input finger image.

Letting S(m) be the value obtained by adding the square errors between Vd(i) and V(i+m) shifted therefrom by m throughout a certain range, the value S(m) is given by $$(m \geq 0) \quad S(m) = \sum_{i=1}^{N-m} \{v(i+m) - Vd(i)\}2 / (N-m) \quad (2)$$

$$(m < 0) \quad S(m) = \sum_{i=m+1}^{N} \{v(i+m) - Vd(i)\}2 / (N-m) \quad (3)$$

where N is the number of elements of V(i).

The value S(m) given in this manner is a parameter representing the similarity between V(i+m) and Vk(i). As the value S(m) decreases, the similarity between V(i+m) and Vk(i) becomes higher.

Let M be the positional offset amount obtained when the value S(m) is minimized as the value m is changed within a certain range. Assume that positioning is complete at the value M.

The errors E are calculated by using:

$$(M \geq 0) \quad E = \sum_{i=1}^{N-M} \{v(i+M) - Vd(i)\}2 \bigg/ \sum_{i=1}^{N-M} Vd(i)2 \quad (4)$$

$$(M < 0) \quad E = \sum_{i=-m+1}^{N} \{v(i+M) - Vd(i)\}2 \bigg/ \sum_{i=-m+1}^{N} Vd(i)2 \quad (5)$$

where N is the number of elements of V(i).

Each of the errors E calculated by equations (4) and (5) is the value obtained by normalizing the value obtained by adding the square errors between the input signal V(i+M) and the dictionary signal Vd(i) throughout a certain range with the square sum of the values of the dictionary signal Vd(i) within the same range.

This value E represents the error between the input signal V(i+M) and the dictionary signal Vd(i). As the value E increases, the difference between the two signals increases, and vice versa.

The finger collation control section 411 then compares the error E calculated in step S204 with a predetermined threshold TH (step S205). If E≦TH, the finger collation control section 411 determines that the corresponding person is a user registered in advance, and terminates the processing (step S206).

If NO in step S205, the finger collation control section 411 determines that the corresponding person is not a user registered in advance, and terminates the processing (step S207).

After the above collation processing, the finger collation control section 411 sends this authentication result to the control section 110.

The control section 110 performs processing in accordance with the authentication result from the finger collation control section 411. More specifically, if it is determined that the person is authenticated, the control section 110 permits him/her to use the scanner section 100. Otherwise, the control section 110 performs corresponding processing, e.g., causing the sound source 114 to sound an alarm.

The image input operation of the scanner section 100 having the finger collation section 115a including the above individual authentication device will be described next with reference to the flow chart of FIG. 14.

First of all, the power supply of the scanner section 100 is turned on, and the scanner section 100 is set in the user wait mode (step S301).

When the user sets an original on the scanner section 100 and depresses the start button 113b integrated with the pattern input section 410 of the finger collation section 115a (step S302), the above authentication processing is performed by the finger collation section 115a (step S303).

If the user cannot be authenticated after the authentication processing, a notice indicating "authentication NG", e.g., "An authentication error has occurred. Put the correct finger." is displayed on the display panel 113a, and an electronic sound like "Bleep, Bleep!" is also generated by the sound source 114 (step S304).

If the user is authenticated, a notice indicating "authentication OK", e.g., "You are authenticated. User ID: 9210001; Name: Suzuki Taro (Development Division)", is displayed on the display panel 113a, and an electronic sound like "Bleep!" is generated by the sound source 114 (step S305).

FIGS. 15B and 15C show sample displays in the above cases.

In the case of "authentication OK", the image input processing is continued until a series of operations is complete (step S306).

Image input processing in the scanner section 100 having the finger collation section 115a including the above individual authentication device will be described next with reference to the flow chart of FIG. 16.

The control section 110 in the scanner section 100 stores the image information read by the read section 115 in the image memory 117 (step S311).

Subsequently, the control section 110 obtains a user ID from the finger collation section 115a, and searches a user setting file by using the user ID, thereby obtaining a file destination directory set for the user (step S312).

The control section 110 then adds a header to the image information and converts the information in accordance with a set file format (described in the user setting file; not shown), as needed. The control section 110 transmits this file to the file server 103 or 104 or the personal computer 105 or 106 which has the set destination directory through the LAN interface (I/F) 118, thereby storing the file in the directory set in the file server 103 or 104 or the personal computer 105 or 106 as the destination.

If, for example, the user is the person with the name "Suzuki Taro" in the user setting file shown in FIG. 15A, the control section 110 determines from the user setting file that the destination is the directory "\doc\text" in the personal computer "\\$pc_{13}$suzuki". The control section 110 therefore communicates with the personal computer "\\$pc_{13}$suzuki" to transmit the file thereto, and the personal computer "\\$pc_{13}$suzuki" stores the received file in the directory "\doc\text".

An image input system according to the second embodiment of the present invention will be described next with reference to FIG. 17.

The system configuration of the image input system of the second embodiment itself is the same as that of the image input system of the first embodiment described above.

In the present invention, by using finger collation for authentication, a given user can use his or her fingers to make the system perform different operations, unlike in other authentication schemes.

As shown in FIG. 17, different destinations can be designated in correspondence with the respective fingers of the user.

Referring to FIG. 17, a document directory in the user PC, a user directory in a file server 103, a user directory in a file server 104, and an intra-section shared directory in the file server 103 are respectively assigned to the second, third, fourth, and fifth fingers.

In the first embodiment described above, one destination directory is set for each user. In the second embodiment, however, destination directories can be designated in correspondence with the respective fingers of each user, as shown in FIG. 18.

In the user setting file shown in FIG. 18, "2:" in "Destination Directory" corresponds to the destination directory to be set when the second finger is used. Similarly, "3:", "4:", and "5:" respectively correspond to the destination directories to be set when the third, fourth, and fifth fingers are used.

In this case, as shown in FIG. 19, a control section 110 in a scanner section 100 stores the image information read by a read section 115 in an image memory 117 (step S311').

Subsequently, the control section 110 obtains a user ID from a finger collation section 115a and information indicating the finger in use, and searches the user setting file with the information indicating the finger in use, thereby obtaining a destination directory corresponding to the user and the finger (step S312').

Figure 14:
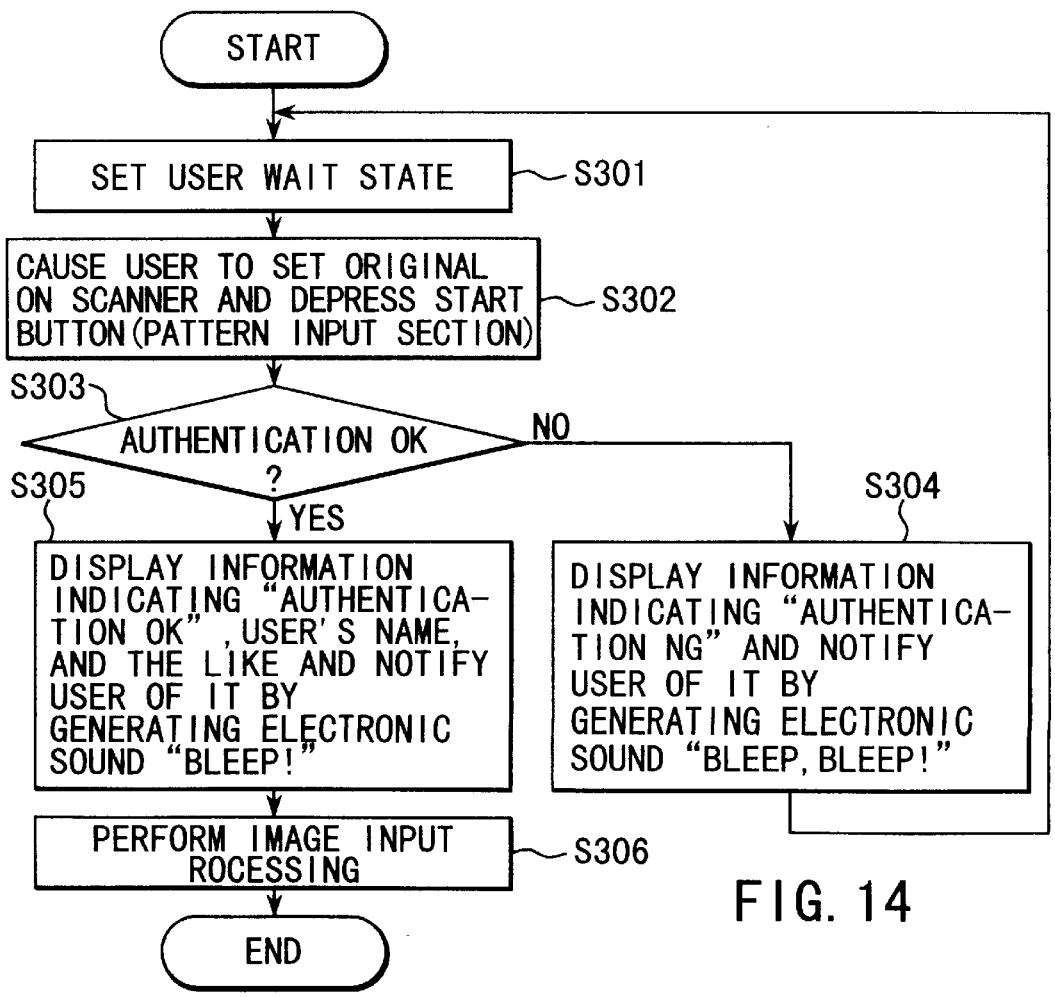
FIG. 14 is a flow chart for explaining the operation of the first embodiment of the present invention.

The subsequent processing is the same as that in FIG. 14 (steps S313, S314, and S315).

An image input system according to the third embodiment of the present invention will be described next with reference to FIGS. 20 and 21.

The system configuration of the image input system of the third embodiment itself is the same as that of the image input system of the first embodiment.

In the third embodiment, in addition to storage of an original image as an image file, various types of image input jobs are performed.

FIG. 20 shows an example of the user setting file used in the third embodiment. FIG. 21 is a flow chart showing the operation of the third embodiment.

Referring to FIG. 20, in "Job", "scn" indicates processing of converting an image into an image file; "ocr", processing performed by an OCR to interpret an image file and converting it into a simple text file; and "mail$_{13}$reader", processing of reading an original of electronic mail constituted by a destination address and the document body, converting the destination address and the document body into a text, and mailing the document body to the destination address.

Referring to the flow chart of FIG. 21, a control section 110 in a scanner section 100 stores the image information read by a read section 115 in an image memory 117 (step S321).

Subsequently, the control section 110 obtains a user ID from the finger collation section 115a, and searches the user setting file by using this user ID, thereby obtaining an image input job of the corresponding user (step S322).

The control section 110 starts the image input job to process the image in the image memory 117 as an input for the job (step S323).

FIG. 22 shows a sample display on a display panel 113a in this case.

According to the system configuration of the image input system in FIG. 1, the image input job server 107 incorporates processing for jobs for an OCR, E-mail, Fax, and the like.

The fourth embodiment of the present invention will be described next with reference to FIG. 23.

In the fourth embodiment of the present invention, as in the second embodiment described above, by using finger collation for authentication, a user can use the respective fingers to make the system perform different operations.

FIG. 23 shows an example of how different input jobs are designated in correspondence with the respective fingers.

In this case, the second finger is used to designate "processing of converting a general document as an original into a simple text file (without format information) through the OCR", the third finger is used to designate "processing of converting a general document as an original into a wordprocessor file by reading format information through the OCR", the fourth finger is used to designate "processing of reading a destination address and a document body from a mail document as an original through the OCR, and transmitting the read data", and the fifth finger is used to designate "processing of reading a destination telephone number from a Fax document as an original through the OCR, and transmitting the read contents as image data".

Figures 25, 26, 27, 28:
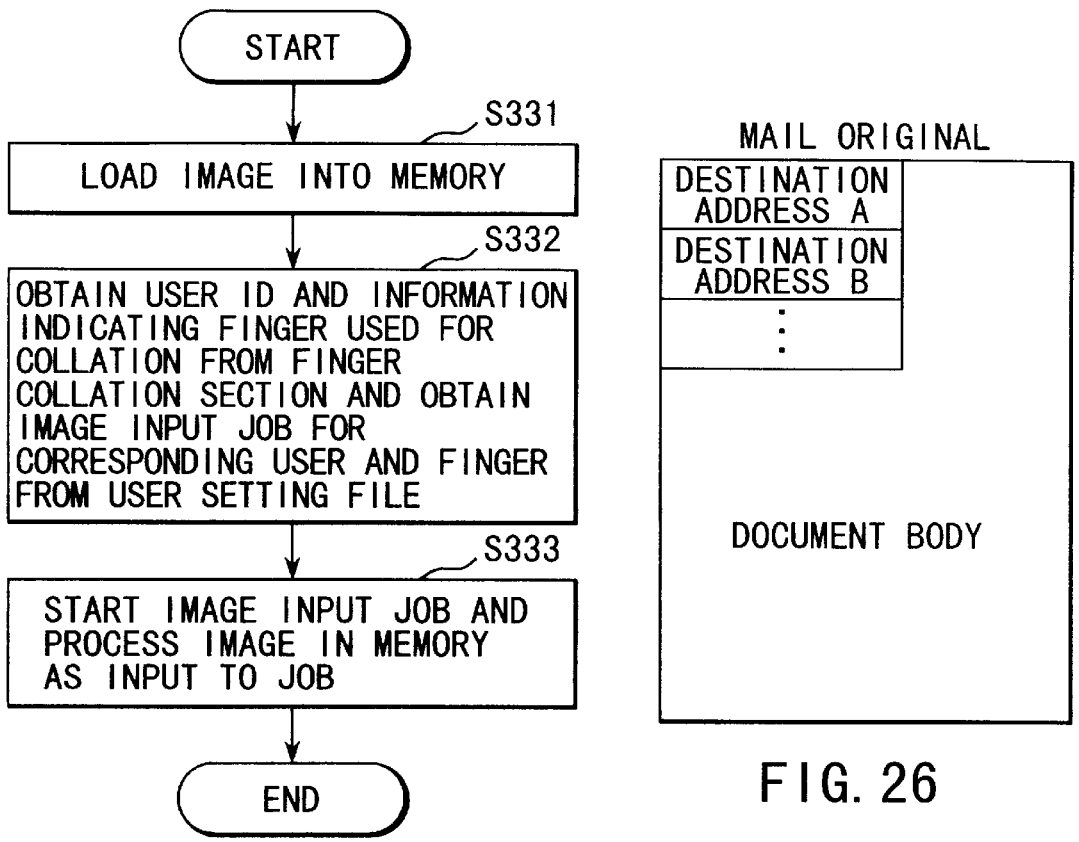
FIG. 25 is a flow chart for explaining image input processing in the fourth embodiment of the present invention.
FIG. 26 is a view showing a mail document in image input processing in the fourth embodiment of the present invention.
FIG. 27 is a view showing a Fax document in image input processing in the fourth embodiment of the present invention.
FIG. 28 is a view showing an order document in a work flow in the image input apparatus according to the fourth embodiment of the present invention.

FIG. 24 shows an example of the user setting file used in the fourth embodiment. FIG. 25 is a flow chart showing the operation of the fourth embodiment.

The symbols for job designation in the user setting file in FIG. 24 have the same meanings as those of the symbols in the user setting file in FIG. 20 which is used in the third embodiment.

The following are examples of the image input jobs designated in this case.

For example, the following is the image input job designated by the second finger of "Suzuki Taro" in "Name" in the user setting file in FIG. 24:

(1) An image is input to the memory.

(2) The image in the memory is input to the OCR, and the output file (text) is transmitted to "\\pc$_{13}$suzuki".

(3) The file is stored as "\doc\document 1. txt" in "\\pc$_{13}$suzuki" (personal computer).

The following is the image input job designated by the third finger of "Suzuki Taro" in "Name" in the user setting file in FIG. 24:

(1) An image is input to the memory.

(2) The image in the memory is input to the OCR with the format, and the output file (wordprocessor file) is transmitted to "\\pc$_{13}$suzuki".

(3) The file is stored as "\doc\document 1. doc" in "\\pc$_{13}$suzuki".

The following is the image input job designated by the fourth finger of "Suzuki Taro" in "Name" in the user setting file in FIG. 24:

(1) An image is input to the memory.

(2) The image in the memory is input to the E-mail reader.

(3) The E-mail reader converts the destination address and the document body into a text, and mails the document body.

The following is the image input job designated by the fifth finger of "Suzuki Taro" in "Name" in the user setting file in FIG. 24:

(1) An image is input to the memory.
(2) The image in the memory is input to the Fax reader.
(3) The Fax reader converts the destination address into a text, and facsimile-sends the document body as image data to the destination address.

When "processing of inputting an order slip as an original to a work flow" is designated by any one of the fingers of the user instead of the corresponding processing described above, an image input job is performed as follows:
(1) An image is input to the memory.
(2) The image in the memory is input as an order slip to the work flow.
(3) The work flow reads information such as the destination of order, the article name, and the source of order, and starts ordering processing.

According to the flow chart of FIG. 25, first of all, a control section 110 in a scanner section 100 stores the image information read by a read section 115 in an image memory 117 (step S331).

Subsequently, the control section 110 obtains a user ID from the finger collation section 115a and information indicating the finger used for authentication, and searches the user setting file with the information indicating the used finger, thereby obtaining an image input job corresponding to the user and the finger (step S332).

The control section 110 then starts the image input job, and processes the image in the image memory 117 as an input for the job (step S333).

FIG. 26 shows a mail document in this case. FIG. 27 shows a Fax document.

FIG. 28 shows an order document in the work flow used when "processing of inputting an order slip as an original to a work flow" is designated by any one of the fingers instead of the corresponding processing described above.

From the above description of the first to fourth embodiments, according to the present invention, the image input system in which the scanner section is shared has the following advantages:

(1) Destination directories are set in advance for the respective users so that a destination directory can be selected in accordance with the finger used for finger quantization. In addition, each user can be identified by finger collation. When images are to be input by using the scanner shared by a plurality of users, the input images can be transmitted/stored to/in the directories set for the respective users without requiring the users to perform extra operations and without allowing breaches of security.

(2) According to advantage (1) described above, since destination directories are fixed, a problem may be posed when a plurality of directories are to be selectively used. For this reason, destination directories are set in advance for the respective fingers of each user so that the destination directory can be selected depending on the finger used for finger authentication. With this arrangement, a plurality of directories which are often used by each user can be easily selected without requiring the user to perform an extra operation.

(3) According to advantage (1), an image can be input as an image file by designating a destination directory. It is convenient for a user, depending on the contents of an image, to convert the image into another type of file, instead of an image file, or input an image to a specific document processing job. When, therefore, jobs to be performed for input images are set for the respective users in advance, a specific job can be performed for an input image for each user.

(4) According to advantage (3), since a job is fixed for each input image, inconvenience may be experienced if, for example, a user often uses a plurality of jobs. For this reason, jobs to be performed for input images are set for the respective fingers of each user in advance so that a job can be selected in accordance with the finger used for authentication. With this arrangement, the user can easily select a plurality of jobs which are often used by the user without requiring the user to perform an extra operation.

When the image input apparatus and method of the present invention are applied to a network scanner system, image input systems and methods according to the following aspects can be provided.

First of all, according to the present invention, there is provided an image input system constituted by a reader for reading an image and a terminal to which the image read by the reader is transmitted through a communication line, characterized in that the reader includes a read means for reading an image, a linear electrode array on which a finger, of a person to be authenticated, which is to be collated is to be placed, the linear electrode array being constituted by a plurality of linear electrodes elongated in a direction perpendicular to a longitudinal direction of the finger and arranged at predetermined intervals along the longitudinal direction of the finger, a switching means for sequentially switching the plurality of linear electrodes of the linear electrode array, a feature extraction means for sequentially reading resistance values between adjacent linear electrodes of the linear electrode array in the longitudinal direction of the finger on the basis of a switching operation for the linear electrodes of the linear electrode array which is performed by the switching means, thereby extracting feature information of the finger from a distribution state of the resistance values, a storage means for storing in advance the feature information, of the finger of the person which is to be collated, extracted by the feature extraction means, a collation means for collating feature information, of the finger of the person which is to be collated, extracted by the feature extraction means again, with the feature information in the storage means, a discrimination means for discriminating on the basis of the collation result obtained by the collation means whether the person is authentic, and a control means for permitting the person to use the read means only when it is determined on the basis of the discrimination result obtained by the discrimination means that the person is authentic.

According to the present invention, there is provided an image input system constituted by a reader for reading an image and a terminal to which the image read by the reader is transmitted through a communication line, characterized in that the reader includes a read means for reading an image, an external interface for outputting image data from the read means to the outside, a linear electrode array on which a finger, of a person to be authenticated, which is to be collated is to be placed, the linear electrode array being constituted by a plurality of linear electrodes elongated in a direction perpendicular to a longitudinal direction of the finger and arranged at predetermined intervals along the longitudinal direction of the finger, a switching means for sequentially switching the plurality of linear electrodes of the linear electrode array, a feature extraction means for sequentially reading resistance values between adjacent linear electrodes of the linear electrode array in the longitudinal direction of the finger on the basis of a switching operation for the linear electrodes of the linear electrode array which is performed by the switching means, thereby extracting feature information of the finger from a distribution state of the resistance values, a storage means for storing in advance the feature information, of the finger of the person which is to be collated, extracted by the feature extraction means, a collation means for collating feature information, of the finger of the person which is to be collated, extracted by the feature extraction means again, with the feature information in the storage means, a discrimination means for discriminating on the basis of the collation result obtained by the collation means whether the person is authentic, and a control means for permitting the person to use the read means only when it is determined on the basis of the discrimination result obtained by the discrimination means that the person is authentic, and transmitting/storing the image data from the read means to/in a predetermined data storage section set by the person in advance through the external interface.

According to the present invention, there is provided an image input system constituted by a reader for reading an image and a terminal to which the image read by the reader is transmitted through a communication line, characterized in that the reader includes a read means for reading an image, a setting means for setting a process to be performed for image data from the read means, a linear electrode array on which a finger, of a person to be authenticated, which is to be collated is to be placed, the linear electrode array being constituted by a plurality of linear electrodes elongated in a direction perpendicular to a longitudinal direction of the finger and arranged at predetermined intervals along the longitudinal direction of the finger, a switching means for sequentially switching the plurality of linear electrodes of the linear electrode array, a feature extraction means for sequentially reading resistance values between adjacent linear electrodes of the linear electrode array in the longitudinal direction of the finger on the basis of a switching operation for the linear electrodes of the linear electrode array which is performed by the switching means, thereby extracting feature information of the finger from a distribution state of the resistance values, a storage means for storing in advance the feature information, of the finger of the person which is to be collated, extracted by the feature extraction means, a collation means for collating feature information, of the finger of the person which is to be collated, extracted by the feature extraction means again, with the feature information in the storage means, a discrimination means for discriminating on the basis of the collation result obtained by the collation means whether the person is authentic, and a control means for permitting the person to use the read means only when it is determined on the basis of the discrimination result obtained by the discrimination means that the person is authentic, and performing a process set through the setting means with respect to the image data from the read means.

According to the present invention, there is provided an image input system constituted by a reader for reading an image and a terminal to which the image read by the reader is transmitted through a communication line, characterized in that the reader includes a read means for reading an image, an external interface for outputting image data from the read means to the outside, a linear electrode array on which a finger, of a person to be authenticated, which is to be collated is to be placed, the linear electrode array being constituted by a plurality of linear electrodes elongated in a direction perpendicular to a longitudinal direction of the finger and arranged at predetermined intervals along the longitudinal direction of the finger, a switching means for sequentially switching the plurality of linear electrodes of the linear electrode array, a feature extraction means for sequentially reading resistance values between adjacent linear electrodes of the linear electrode array in the longitudinal direction of the finger on the basis of a switching operation for the linear electrodes of the linear electrode array which is performed by the switching means, thereby extracting feature information of each finger to be collated from a distribution state of the resistance values, a storage means for storing in advance the feature information, of each finger of the person which is to be collated, extracted by the feature extraction means, a collation means for collating feature information, of each finger of the person which is to be collated, extracted by the feature extraction means again, with the feature information read in the storage means, a discrimination means for discriminating on the basis of the collation result obtained by the collation means whether the person is authentic, and a control means for permitting the person to use the read means only when it is determined on the basis of the discrimination result obtained by the discrimination means that the person is authentic, and transmitting/storing the image data from the read means to/in one of predetermined data storage sections set for the respective fingers by the person in advance through the external interface.

According to the present invention, there is provided an image input system constituted by a reader for reading an image and a terminal to which the image read by the reader is transmitted through a communication line, characterized in that the reader includes a read means for reading an image, a setting means for setting a process to be performed for image data from the read means, a linear electrode array on which a finger, of a person to be authenticated, which is to be collated is to be placed, the linear electrode array being constituted by a plurality of linear electrodes elongated in a direction perpendicular to a longitudinal direction of the finger and arranged at predetermined intervals along the longitudinal direction of the finger, a switching means for sequentially switching the plurality of linear electrodes of the linear electrode array, a feature extraction means for sequentially reading resistance values between adjacent linear electrodes of the linear electrode array in the longitudinal direction of the finger on the basis of a switching operation for the linear electrodes of the linear electrode array which is performed by the switching means, thereby extracting feature information of each finger to be collated from a distribution state of the resistance values, a storage means for storing in advance the feature information, of each finger of the person which is to be collated, extracted by the feature extraction means, a collation means for collating feature information, of each finger of the person which is to be collated, extracted by the feature extraction means again, with the feature information in the storage means, a discrimination means for discriminating on the basis of the collation result obtained by the collation means whether the person is authentic, and a control means for permitting the person to use the read means only when it is determined on the basis of the discrimination result obtained by the discrimination means that the person is authentic, and performing one of processes set for the respective fingers by the person through the setting means with respect to the image data from the read means.

According to the present invention, there is provided an image input method in an image input system constituted by a reader for reading an image and a terminal to which the image read by the reader is transmitted through a communication line, characterized by comprising the steps of reading an image, placing a finger, of a person to be authenticated, which is to be collated on a linear electrode array elongated in a direction perpendicular to a longitudinal direction of the finger and arranged at predetermined intervals along the longitudinal direction of the finger, sequentially switching the plurality of linear electrodes of the linear electrode array, sequentially reading resistance values between adjacent linear electrodes of the linear electrode array in the longitudinal direction of the finger on the basis of a switching operation for the linear electrodes of the linear electrode array, thereby extracting feature information of the finger from a distribution state of the resistance values, storing in advance the extracted feature information of the finger to be collated in a storage means, collating re-extracted feature information with the feature information in the storage means, discriminating on the basis of the collation result whether the person is authentic, and permitting the person to perform the image read operation only when it is determined on the basis of the discrimination result that the person is authentic.

According to the present invention, there is provided an image input method in an image input system constituted by a reader for reading an image and a terminal to which the image read by the reader is transmitted through a communication line, characterized by comprising the steps of reading an image, placing a finger, of a person to be authenticated, which is to be collated on a linear electrode array elongated in a direction perpendicular to a longitudinal direction of the finger and arranged at predetermined intervals along the longitudinal direction of the finger, sequentially switching the plurality of linear electrodes of the linear electrode array, sequentially reading resistance values between adjacent linear electrodes of the linear electrode array in the longitudinal direction of the finger on the basis of a switching operation for the linear electrodes of the linear electrode array, thereby extracting feature information of the finger from a distribution state of the resistance values, storing in advance the extracted feature information of the finger to be collated in a storage means, collating re-extracted feature information with the feature information in the storage means, discriminating on the basis of the collation result whether the person is authentic, and permitting the person to perform the image read operation only when it is determined on the basis of the discriminaton result that the person is authentic, and transmitting/storing the read image data to/in a predetermined data storage section set by the person in advance.

According to the present invention, there is provided an image input method in an image input system constituted by a reader for reading an image and a terminal to which the image read by the reader is transmitted through a communication line, characterized by comprising the steps of reading an image, setting a process to be performed for the read image data, placing a finger, of a person to be authenticated, which is to be collated on a linear electrode array elongated in a direction perpendicular to a longitudinal direction of the finger and arranged at predetermined intervals along the longitudinal direction of the finger, sequentially switching the plurality of linear electrodes of the linear electrode array, sequentially reading resistance values between adjacent linear electrodes of the linear electrode array in the longitudinal direction of the finger on the basis of a switching operation for the linear electrodes of the linear electrode array, thereby extracting feature information of the finger from a distribution state of the resistance values, storing in advance the extracted feature information of the finger to be collated in a storage means, collating re-extracted feature information with the feature information in the storage means, discriminating on the basis of the collation result whether the person is authentic, and permitting the person to perform the image read operation only when it is determined on the basis of the discrimination result that the person is authentic, and performing a predetermined job set by the person in advance with respect to the read image data.

According to the present invention, there is provided an image input method in an image input system constituted by a reader for reading an image and a terminal to which the image read by the reader is transmitted through a communication line, characterized by comprising the steps of reading an image, placing a finger, of a person to be authenticated, which is to be collated on a linear electrode array elongated in a direction perpendicular to a longitudinal direction of the finger and arranged at predetermined intervals along the longitudinal direction of the finger, sequentially switching the plurality of linear electrodes of the linear electrode array, sequentially reading resistance values between adjacent linear electrodes of the linear electrode array in the longitudinal direction of the finger on the basis of a switching operation for the linear electrodes of the linear electrode array, thereby extracting feature information of each finger to be collated from a distribution state of the resistance values, storing in advance the extracted feature information of each finger to be collated in a storage means, collating re-extracted feature information of each finger to be collated with the feature information of each finger to be collated in the storage means, discriminating on the basis of the collation result whether the person is authentic, and permitting the person to perform the image read operation only when it is determined on the basis of the discrimination result that the person is authentic, and transmitting/storing the read image data to/in one of predetermined data storage sections set for the respective fingers by the person in advance.

According to the present invention, there is provided an image input method in an image input system constituted by a reader for reading an image and a terminal to which the image read by the reader is transmitted through a communication line, characterized by comprising the steps of reading an image, setting a process to be performed for the read image data, placing a finger, of a person to be authenticated, which is to be collated on a linear electrode array elongated in a direction perpendicular to a longitudinal direction of the finger and arranged at predetermined intervals along the longitudinal direction of the finger, sequentially switching the plurality of linear electrodes of the linear electrode array, sequentially reading resistance values between adjacent linear electrodes of the linear electrode array in the longitudinal direction of the finger on the basis of a switching operation for the linear electrodes of the linear electrode array, thereby extracting feature information of each finger to be collated from a distribution state of the resistance values, storing in advance the extracted feature information of each finger to be collated in a storage means, collating re-extracted feature information of each finger to be collated with the feature information of each finger to be collated in the storage means, discriminating on the basis of the collation result whether the person is authentic, and permitting the person to perform the image read operation only when it is determined on the basis of the discrimination result that the person is authentic, and performing one of predetermined jobs set for the respective fingers by the person in advance with respect to the read image data.

As has been described in detail above, therefore, according to the present invention, in an image input system in which input images from a scanner shared by a plurality of users are transmitted to file serves and users' personal computers through a LAN (Local Area Network), there are provided an image input apparatus and method which can execute proper processes in accordance with the settings made by the respective users, when images are input by using the scanner shared by a plurality of users, without requiring each user to perform an extra operation and without allowing breaches of security.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

I claim:

1. An image input method using read means for reading an image, comprising the steps of:
    extracting feature information of a finger, of a person to be authenticated, which is to be subjected to collation;
    storing in advance the extracted feature information of the finger of the person which is to be collated;
    collating re-extracted feature information of the finger of the person, which is to be collated, with the feature information stored in advance; and
    controlling an image input operation of said read means based on a result obtained by collating the feature information,
    wherein the step of controlling the image input operation comprises permitting the person to use said read means only when the collation result obtained indicates that the person is authentic, and
    wherein the step of controlling the image input operation comprises performing a predetermined process set by the person in advance with respect to image data read by said read means.

2. A method according to claim 1, wherein the step of controlling the image input operation comprises providing an instruction to store image data read by said read means in a predetermined data storage section set by the person in advance.

3. A method according to claim 1, wherein the step of controlling the image input operation comprises transmitting image data read by said read means to an external data storage section set by the person in advance through an interface.

4. An image input apparatus comprising:
    read means for reading an image;
    feature extraction means for extracting feature information of each finger, of a person to be authenticated, which is to be subjected to collation;
    storage means for storing in advance the feature information, of each finger of the person which is to be collated, extracted by said feature extraction means;
    collation means for collating feature information, of each finger of the person which is to be collated, extracted by said feature extraction means again, with the feature information read out from said storage means; and
    control means for controlling a job set for each finger by the person in advance with respect to said read means based on a collation result obtained by said collation means,
    wherein said control means permits the person to use said read means only when the collation result obtained by said collation means indicates that the person is authentic, and
    wherein said control means performs a predetermined process set for each finger by the person in advance with respect to image data read by said read means.

5. An apparatus according to claim 4, wherein said control means provides an instruction to store image data read by said read means in one of predetermined data storage sections set for the respective fingers by the person in advance.

6. An apparatus according to claim 4, wherein said control means transmits image data read by said read means to one of external data storage sections set for the respective fingers by the person in advance through an interface.

7. An image input method using read means for reading an image, comprising the steps of:
    extracting feature information of each finger, of a person to be authenticated, which is to be subjected to collation;
    storing in advance the extracted feature information of each finger of the person which is to be collated;
    collating re-extracted feature information of each finger of the person, which is to be collated, with the feature information stored in advance; and
    controlling a job set for each finger by the person in advance with respect to said read means based on a result obtained by collating the feature information,
    wherein the step of controlling comprises permitting the person to use said read means only when the collation result obtained indicates that the person is authentic, and
    wherein the step of controlling comprises performing a predetermined process set for each finger by the person in advance with respect to image data read by said read means.

8. A method according to claim 7, wherein the step of controlling the image input operation comprises providing an instruction to store image data read by said read means in one of predetermined data storage sections set for the respective fingers by the person in advance.

9. A method according to claim 7, wherein the step of controlling the image input operation comprises transmitting image data read by said read means to one of external data storage sections set for the respective fingers by the person in advance through an interface.

10. An image input apparatus comprising:
    read means for reading an image;
    a linear electrode array on which a finger, of a person to be authenticated, which is to be collated is to be placed, said linear electrode array being constituted by a plurality of linear electrodes elongated in a direction perpendicular to a longitudinal direction of the finger and arranged at predetermined intervals along the longitudinal direction of the finger;
    switching means for sequentially switching said plurality of linear electrodes of said linear electrode array;
    feature extraction means for sequentially reading resistance values between adjacent linear electrodes of said linear electrode array in the longitudinal direction of the finger based on a switching operation for said linear electrodes of said linear electrode array which is performed by said switching means, thereby extracting feature information of the finger from a distribution state of the resistance values;
    storage means for storing in advance the feature information, of the finger of the person which is to be collated, extracted by said feature extraction means;
    collation means for collating feature information, of the finger of the person which is to be collated, extracted by said feature extraction means again, with the feature information read out from said storage means; and control means for controlling an image input operation of said read means based on a collation result obtained by said collation means, wherein said control means permits the person to use said read means only when the collation result obtained by said collation means indicates that the person is authentic, and wherein said control means performs a predetermined process set by the person in advance with respect to image data read by said read means.

11. An apparatus according to claim 10, wherein said control means provides an instruction to store image data read by said read means in a predetermined data storage section set by the person in advance.

12. An apparatus according to claim 10, wherein said control means transmits image data read by said read means to an external data storage section set by the person in advance through an interface.

13. An image input method using read means for reading an image, comprising the steps of:

placing a finger, of a person to be authenticated, which is to be collated on a linear electrode array elongated in a direction perpendicular to a longitudinal direction of the finger and arranged at predetermined intervals along the longitudinal direction of the finger;

sequentially switching said plurality of linear electrodes of said linear electrode array;

sequentially reading resistance values between adjacent linear electrodes of said linear electrode array in the longitudinal direction of the finger based on a switching operation for said linear electrodes of said linear electrode array, thereby extracting feature information of the finger from a distribution state of the resistance values;

storing in advance the extracted feature information of the finger to be collated in storage means;

collating re-extracted feature information with the feature information in said storage means; and controlling an image input operation of said read means based on a result obtained by collating the feature information, wherein the step of controlling the image input operation comprises permitting the person to use said read means only when the collation result obtained indicates that the person is authentic, and wherein the step of controlling the image input operation comprises performing a predetermined process set by the person in advance with respect to image data read by said read means.

14. A method according to claim 13, wherein the step of controlling the image input operation comprises providing an instruction to store image data read by said read means in a predetermined data storage section set by the person in advance.

15. A method according to claim 13, wherein the step of controlling the image input operation comprises transmitting image data read by said read means to an external data storage section set by the person in advance through an interface.

\* \* \* \* \*